(12) United States Patent
Volden et al.

(10) Patent No.: US 8,481,890 B2
(45) Date of Patent: Jul. 9, 2013

(54) TEXTILE HAVING WATER TRANSPORT AND HEATING CAPABILITIES

(75) Inventors: Tormod Volden, Lucerne (CH); Trond Heldal, Lucerne (CH); Per Arne Lislien, Horten (NO)

(73) Assignee: Osmotex AG, Alpnach Dorf (CH)

( * ) Notice: Subject to any disclaimer, the term of this patent is extended or adjusted under 35 U.S.C. 154(b) by 352 days.

(21) Appl. No.: 12/674,451

(22) PCT Filed: Aug. 20, 2008

(86) PCT No.: PCT/GB2008/002815
§ 371 (c)(1),
(2), (4) Date: May 28, 2010

(87) PCT Pub. No.: WO2009/024779
PCT Pub. Date: Feb. 26, 2009

(65) Prior Publication Data
US 2010/0288370 A1    Nov. 18, 2010

(30) Foreign Application Priority Data

Aug. 22, 2007 (GB) .................................. 0716384.3

(51) Int. Cl.
*H05B 1/00* (2006.01)
(52) U.S. Cl.
USPC ........................................................ 219/211
(58) Field of Classification Search
USPC ................... 219/211–212, 545, 549
See application file for complete search history.

(56) References Cited

U.S. PATENT DOCUMENTS

| | | | |
|---|---|---|---|
| 4,713,531 A | 12/1987 | Fennekels et al. | |
| 5,302,807 A | 4/1994 | Zhao | |
| 5,319,867 A * | 6/1994 | Weber | 36/44 |
| 6,320,160 B1 * | 11/2001 | Eidsnes et al. | 219/211 |
| 6,720,539 B2 * | 4/2004 | DeAngelis et al. | 219/545 |
| 7,276,028 B2 * | 10/2007 | Ellingsen et al. | 600/309 |
| 2003/0208851 A1 | 11/2003 | DeAngelis et al. | |
| 2004/0062910 A1 | 4/2004 | Morrison | |

FOREIGN PATENT DOCUMENTS

| | | |
|---|---|---|
| CN | 1463181 A | 12/2003 |
| DE | 4233118 A1 | 1/1994 |
| DE | 10245243 B3 | 3/2004 |
| EP | 0993328 A1 | 4/2000 |
| WO | 99/00166 A1 | 1/1999 |

OTHER PUBLICATIONS

International Search Report of Application No. PCT/GB2008/002815 mailed Nov. 19, 2008.
UK Search Report of Application No. GB 0716384.3 mailed Feb. 12, 2008.

* cited by examiner

*Primary Examiner* — Calvin Lee
(74) *Attorney, Agent, or Firm* — Lowe Hauptman Ham & Berner, LLP (57) ABSTRACT

A textile (10) comprising first and second conductive layers (12a, 12b); at least one porous layer (14) positioned between first and second conductive layers (12a, 12b), the pores of said porous layer (14) extending in a direction substantially perpendicular to said conductive layers (12a, 12b); the conductive layers (12a, 12b) being connected to an electric signal generator (15) such that, in use, a voltage can be applied across said porous layer (14) to effect directional flow of liquid across said textile (10), and a voltage can also be applied along at least one of the conductive layers (12a, 12b) to effect heating of said textile (10).

18 Claims, 4 Drawing Sheets

TEXTILE HAVING WATER TRANSPORT AND HEATING CAPABILITIES

RELATED APPLICATIONS

The present application is based on International Application Number PCT/GB2008/002815, filed Aug. 20, 2008, and claims priority from British Application Number 0716384.3, filed Aug. 22, 2007, the disclosures of which are hereby incorporated by reference herein in their entirety.

The present invention relates to a textile having both water transport and heating capabilities, for use in a variety of applications.

The human body, particularly during periods of physical activity such as sport or physical labour, exudes perspiration, which ideally should be transported away from the skin in order to let the body's temperature control function properly. If evaporation is not allowed, a drastic loss in performance can result, and in dramatic cases the dangerous condition of hyperthermia can occur. Sports performers and fire fighters are among the groups to which this is an important concern. Most textiles, and especially protective and water proof textiles, have very poor abilities to transport humidity and fail to provide effective transportation at even moderate sweating rates. In addition to the danger of overheating there also exists a danger of too much cooling, as wet clothing conducts heat several times faster than dry clothing. When perspiration remains close to the body, heat is also lost through evaporation, as the heat required for this process is drawn from the human body.

Modern pieces of clothing, in particular those which are expected to be exposed to perspiration, are often composed of several layers (laminates) of textiles, by means of which an attempt is made to secure insulation together with optimal liquid transport capacity. For example, a woollen inner layer can be placed next to the body, as wool fibres are one of the few fabrics which have a high liquid transport capacity. This layer therefore serves to transport moisture into the outer layers of clothing, where evaporation can take place with the aid of heat from external surroundings rather than the human body.

More generally, humidity control represents a potential problem for all things subject to water in the form of condensation, rain, perspiration, process water, ground water etc. For example buildings, public transport and packaging all require humidity levels to be controlled.

EP 0993328 discloses a method of fluid transport in textiles, which utilises the phenomena of electroosmosis to drive liquid through the textile in a desired direction.

A piece of cloth, acting as a porous layer, is sandwiched between two conductive layers. These layers may be made of a conductor or semiconductor material and may be woven into the fabric or laminated thereto. The conductive layers are connected to an electric pulse transmitter which is arranged to transmit a series of unidirectional pulses interrupted by a pulse of opposite polarity. These pulses induce electroosmotic movement of fluid within the textile away from the human body towards the outer side of the garment.

The phenomena of electroosmosis is well known and used in many different fields. It relates to the motion of polar liquid through a porous structure under the influence of an applied electric field. Most surfaces possess a negative charge due to surface ionisation. When an ionic fluid is placed in contact with the surface, a layer of cations builds up near the surface to screen this negative charge and maintain the charge balance. This creates an electron double layer (EDL). When an electric filed is, applied, the ions in the EDL are attracted towards the oppositely charged electrode, dragging the surrounding medium with them due to viscous forces. This causes the fluid to move towards the negatively charged electrode.

This form of electro osmosis, known as classical or ordinary electroosmosis (EO1), normally requires a direct electric field component to be present in order to obtain directed liquid transport. This can result in several side effects, such as gas evolution and the establishment of pore concentration profiles along the pore axis, which reduce the efficiency of the system and can make the system unreliable. These side effects can be reduced, although not eradicated, by using a pulsed current.

WO 2004/07045 discloses a system of liquid transport through fabric material using electroosmosis of the second kind, also referred to as secondary or super fast electroosmosis (EO2).

In contrast to classical electroosmosis, electroosmosis of the second kind acts on ions within a space charge region (SCR) associated with the surface, not those ions in the EDL. Transport by EO2 is 10-100 times faster than for classical electroosmosis at the same electric field strength. Consequently, fast transport of liquid can be achieved at relatively low potentials. In addition, the velocity obtained using EO2 is non linear to the main electric field strength. Therefore AC can be used to drive the process, thus preventing the problems discussed above concerning gas evolution and degeneration of the electroosmotic effect. However, in order to generate an SCR so that super fast electroosmosis can be obtained, the porous layer must comprise a conducting means having certain properties concerning pore construction and smoothness. These additional considerations can increase the production cost of the fabric.

Therefore, it is known to use of various types electroosmosis for transporting fluid through textiles and other porous materials. This can be used to direct Perspiration away from the human body as well as to control humidity conditions in, for example, tents and buildings.

However, the evaporation of perspiration and other liquids is still reliant on heat from the surroundings: In cold conditions therefore evaporation may not occur and could lead to the fabric becoming water-logged, or saturated.

More generally, there is currently a limited temperature range over which most items of clothing can provide adequate comfort to the wearer. A decrease in temperature will result in an additional item of clothing being used in order to keep the wearer warm. In tents and buildings, insulation can be used to protect the inhabitants against cooler weather, however this has the disadvantage of also retaining heat in hot weather, thus leading to overheating. The comfortable temperature range is therefore not broadened by insulating a building, only shifted.

Viewed from one aspect the present invention provides a textile comprising first and second conductive layers; at least one porous layer positioned between first and second conductive layers, the pores of said porous layer extending in a direction substantially perpendicular to said conductive layers; the conductive layers being connected to an electric signal generator such that, in use, a voltage can be applied across said porous layer to effect directional flow of liquid across said textile, and a voltage can also be applied along at least, one of the conductive layers to effect heating of said textile.

Therefore, the present invention provides an improvement over existing water transport technologies, by adapting the components of these systems such that a heating function can also be obtained.

By "substantially perpendicular" it is meant that the pores of the porous layer extend from first to second conductive layers so as to form a path for directed liquid transport between the conductive layers. In other words, the pore axes are offset from the plane of the conductive layers by a sufficient amount to allow, in use, liquid to flow under the action of electro-osmosis from one conductive layer to the other.

When creating a textile for fluid transport via electroosmosis, a porous layer is positioned between two conductive layers. In use voltage must be applied across the porous layer, (i.e. from first to second or second to first conductive layer) in order to induce fluid transport by electro-osmosis, e.g. classical electroosmosis or electroosmosis of the second kind. However, the inventors of the present invention have realised that, in addition to fulfilling this function, the same apparatus can further be used, through a minor adaptation, to heat the fabric: This is achieved by connecting at least one of the conductive layers to the signal generator such that a current can be passed along the length of this layer. This will result in the conductive layer heating up and thus warming the surrounding fabric.

This function of the textile provides benefits both individually, by providing additional warmth to the user, and in combination with the liquid transport function, by providing a source of heat to evaporate the transported fluid. These benefits can be provided with minimal alteration to the textile—no additional layers or devices need to be included within the textile. Hence, the present invention allows the benefits of heating to be obtained at no significant cost or complexity.

The present invention is intended for use in many types of material. The term "textile" is intended to include all woven, knitted, felted, fibrous materials, for example, fabrics, geotextiles, tarpaulin etc.

The signal generator can be connected to the conductive layers so as to effect heating of either the first or second, or both, conductive layers.

In order to effect heating of the at least one conductive layer, this must be connected to the electric signal generator at least two points, such that a current can pass along the conductive layer. Preferably the conductive layers are connected to the signal generator by means of electrical contacts. These contacts provide areas removed from the conductive layers which enable leads to be electrically connected to the conductive layers without risk of perforation of these layers or the porous layer.

The electrical Contacts preferably comprise plugs attached to the conductive layers. These plugs are connected to leads which are in turn connected to the electric signal generator. Alternatively parts of the conductive layer itself may be used to form the contacts, these parts extending beyond the boundary of the conductive layer to provide a physically removed contact area. In such embodiments it is also possible for these parts of the conductive layer to form leads to the signal generator, e.g. a wire from within the conductive layer can extend beyond this and connect to the signal generator.

In one embodiment, each conductive layer comprises a first electrical contact and at least one conductive layer further comprises an additional electrical contact. The first electrical contacts are connected to the electric signal generator so as to apply, in use, a voltage across the porous layer while the additional contact is connected to the electric signal generator for operation with the relevant first contact so as to apply, in use, a voltage along the at least one conductive layer to effect heating of the textile. By "relevant first contact" it is meant the first contact attached to the same conductive layer as the additional contact.

Viewed from another aspect the present invention provides a textile comprising first and second conductive layers; at least one porous layer positioned between said first and second conductive layers, the pores of said porous layer extending in a direction substantially perpendicular to said conductive layers; and at least one electrical contact attached to each conductive layer for connection to an electric signal generator, such that in use, a voltage can be applied across said porous layer to effect directional flow of liquid across said textile, and at least one additional electrical contact attached to at least one of the conductive layers for connection to an electric signal generator such that, in use, a voltage can be applied along at least one of the conductive layers to effect heating of said textile.

While only one additional contact is necessary, it is preferable for two additional contacts to be attached to the at least one conductive layer. This is so that both these contacts, and those used in the generation of the electroosmotic effect, can be optimally positioned for their individual functions.

Additional contact(s) can be positioned on both first and second conductive layers. This increases the heat generating capacity of the textile and also increases its versatility, i.e. either conductive layer may be used individually to generate heat. This is useful if, for example, the textile is to be used in: a reversible piece of clothing, in which liquid may need to be transported in either direction. In such circumstances having the ability to heat either side of the fabric ensures that, regardless of the direction of water transport, the transported water can be assisted in its evaporation by a conductive layer. In other embodiments, the conductive layer nearest to the wearer could be operated to provide heat to warm the wearer while the conductive layer furthest from the wearer could be operated when heat is required to assist in evaporation. Both layers could also be jointly operated to generate heat if desired. For example, this could be used to give three levels of heat to the occupier of a vehicle seat. Firstly, a low heat setting, when the conductive layer furthest from the user is used to generate heat. Secondly, a higher heat setting in which the conductive layer closer to the user is heated. Finally, both conductive layers can be used to generate heat to provide the highest heat setting.

In some embodiments more than one electrical contact is used on each conductive layer in order to effect liquid transport within the textile. This can be necessary in order to achieve an even current-distribution through the textile in cases where a large area of textile is to be used for liquid transport, or in embodiments in which the conductive layers have a low conductivity. In such embodiments, the additional electrical contact(s) can be arranged to assist in effecting liquid transport. Alternatively, or in addition, multiple electric contacts can be included on each conductive layer for use solely for liquid transport.

It is possible to use the textile with an electric signal generator and power supply which are separate from the textile, for example when the fabric is used in permanent structures, such as buildings. Preferably however, in relation to the second aspect of the invention, the textile further comprises an electric signal generator connected to said conductive layers by way of said contacts and arranged to supply voltage to said conductive layers in order to effect liquid transfer and heating. Preferably, in relation to the first aspect of the present invention, the electric signal generator is located within the textile. This increases the portability of the textile and its ease of use, as the connections between the generator and contacts do not need to be dismantled and reattached when moved. Although in some embodiments it is possible for separate signal generators to be used for generating the water transport and heating signals, it is preferable to use a single electric signal generator for both functions.

Preferably the textile further comprises a power supply connected to the signal generator, such as a battery or solar panel.

The signal generator is typically arranged to send two signal types to the conductive layers. Firstly a liquid transport signal, which is supplied across the porous layer to effect water transport, and secondly a heating signal, which can be supplied along one or more conductive layers to effect heating. The liquid transport signal and heating signal may both vary in, for example, timing, strength, frequency etc, according to the operating conditions and desired effect of the textile.

Preferably the textile further comprises a control means for control of the electric signal generator. Using such a control means, the signal generator can be controlled to send these signals in any number of sequences, either automatically or upon manual operation, or both.

In many embodiments the electric signal generator and control means are provided integrally, in a single device. Often the power supply is further incorporated into this device.

In a particularly preferred embodiment, the textile can further comprise sensors capable of providing information on environmental Conditions, such as temperature or humidity sensors, or physiological sensors for monitoring bodily functions such as heart rate. Other sensors, such as pressure or electronic (current, conductivity, capacitance, impedance etc) sensors may also be used. All these sensors provide information on the operational conditions of the textile. Information from these sensors can be sent to the control means, which is preferably arranged to control the electric signal generator to effect the water transport and/or heating of the textile based on this information.

For example, if the sensors detect a high heart rate, the conductive layers can be operated to induce water transport to ensure sweat is moved away from the wearer's body. If the sweat transported through the porous layer does not evaporate at an adequate rate, and an excess of moisture is detected within the fabric, the control means can adjust the operation of the textile to include heating periods. Alternatively, once the heart rate of the user is sensed to have returned to normal levels, a period of heating could be entered. In this way the heating would not interfere with the wearer during periods of activity, but would only occur afterwards, when the user would be most likely to be made uncomfortable by the cooling effects of sweat. An absorbent layer could be used to retain the transported perspiration prior to heating. The sensors could also detect external temperatures so that heating could be effected by the control means if the temperature dropped below a pre-determined or user determined temperature.

The porous layer (and conductive layers) must be able to transport water but does not need to comprise a macro-porous material. Instead, "porous" should be understood to cover so-called nanoporous materials with pore-sizes in the range 0.1-1000 nanometer, microporous materials with pore sizes in the micrometer range (1-1000 micrometer) as well as materials with pore-sizes up to a few (e.g. 3) mm. The important feature is the presence of voids (pores) large enough to let liquids through (typically water, but also other liquids like alcohols). The pore-size can be decided depending on desired liquid transport capabilities of the textile, e.g. flow-rates, pumping pressures, ability to transport larger molecules etc. One example of a nanoporous, material which could be used to create the porous layer is an ion exchange membrane such as Nafion, which has a pore size of less than 10 nm. Reverse osmosis membranes can have pore size as low as 0.1 nm, while various filtration membranes can have pore sizes in the nm range and up to several micrometers.

The conductive layers can be formed by conductive ink or the like, coated onto the textile by means of spray coating or conductive printing. Preferably however the conductive layers are metal filament woven textiles with a metal content of between 3 and 100% by weight. More preferably the metal content is between 15 and 45% by weight. Therefore the conductive layers form part of the textile itself. Preferred metals for use in the conductive layers are steel, inconel alloy and titanium. The latter two materials are particularly preferred as these are resistant to corrosion.

Other possible materials from which the conductive layers can be constructed are carbon fibre, metal grids, woven or non-woven porous membranes, other structures consisting of carbon or metal filled polymer, and inherently conductive polymers such as chemically doped polyaniline.

Preferably, the one or more conductive layers which, in use, effect heating of the textile has a higher metal content than those conductive layers without this function. Typically the metal content of a conductive layer arranged to heat the textile would be between 50 and 100% by weight. Alternatively, an additional embroidered metal structure is positioned in contact with the at least one conductive layer. This enhances conductivity and helps to evenly distribute the current.

Preferably the conductive layers also contain silver yarn. As well as increasing conductivity, this also provides the textile with antibacterial qualities.

In addition to the three layers required in the textile, it is often preferable to include additional porous layers between or outside these layers.

For example, one or more absorbent layers can be included in the textile. This could be used to collect moisture from the air or to collect water which has passed through the porous layer, for example prior to its evaporation. Such layers could be positioned between the porous layer and a conductive layer or on the opposing side of the conductive layer (opposite the porous layer).

In some embodiments a protective layer can be included on at least one side of the porous layer. This could be positioned on the opposite side of the conductive layer from the porous layer, or between the conductive layer and the porous layer, in order to exclude undesired substances, for example salt, which may block the porous layer. The side of the porous layer on which the protective layer is positioned would depend on the direction of liquid transport which the textile was adapted to perform. In embodiments were liquid transport may occur in either direction protective layers can be included on both sides of the porous layer.

In addition, electrically insulating layers such as porous polymer grids, textiles, non-wovens or membranes can preferably be introduced between the porous layer and first and/or second conductive layers.

The layers of the textile can be laminated together, preferably using web lamination, point lamination or spray lamination. In such embodiments the glue used for lamination can act as an electrically insulating layer between the porous and conductive layers, depending on its thickness. This saves the need for additional layers to be manufactured and introduced into the textile. Laminating the layers together also allows the fluidic path to be kept short and for the distance between the conductive layers to be reduced, to enhance fluid transport.

The present invention can be used to provide liquid transport via all types of electroosmosis, depending on the structure of the porous layer and the signal applied by the electric signal generator during use. However, classical or secondary electroosmosis are particularly preferred. The apparatus of both EP 0993328 and WO2004/07045 for example can be adapted to include the heating function of the present invention simply through arrangement of additional connections to the conductive layers and alteration of the signals applied. No adjustment to the composition of the fabric or textile itself is required.

In one embodiment, the porous layer is constructed to provide liquid transport via classical electroosmosis. In such embodiments no particular requirements are necessary as regards the porous layer and this can simply comprise a layer of textile material. Generally, the average pore size of the material should be below 3 mm and preferably less than 0.1 mm.

In preferred embodiments, the porous layer is a porous membrane made of a hydrophobic polymer. This prevents the occurrence of a soaked membrane matrix, which would not contribute significantly to liquid transport. This type of membrane also has the advantage that it does not retain water after the water within the pores is removed by liquid transport.

Preferably the hydrophobic membrane material is selected from polymer materials such as polyvinylidenefluoride (PVDF) or more preferably polyethylene. Preferably the hydrophobic membrane is treated (during manufacture) with a hydrophilising surface treatment. This treatment could, for example, introduce sulfonic acid groups, or neutral groups, onto the pore surface.

Preferably the average pore side is between 0.03 and 10 µm, and more preferably between 0.1 and 0.1 µm. When a large flow rate and low pressure pumping through the textile are desired, it is preferred that the pore size is no less than this as smaller pores would represent a waste of energy due to the small volume of liquid transport obtained.

Such membrane qualities result in a strong water transport ability, thus increasing the effectiveness of the fabric. For example, a membrane having a pore size of between 0.1 and 1 µm can typically transport several liters of water per hour per square meter using a voltage of below 10V.

There are some embodiments however in which a smaller pore size would be beneficial, for example when a small flow rate and high pumping pressure are desired.

Alternatively, the membrane can be a porous ion exchange membrane preferably having sulfonic acid ionogenic groups. This has the advantage of providing a hydrophilic surface and therefore encourages the build up of an EDL.

In an alternative embodiment, the porous layer is constructed to provide water transport via electroosmosis of the second kind.

In such embodiments, it is necessary for the porous layer to comprise a conducting means shaped so as generate both tangential and normal electric field components. The most common way to achieve this is for the porous layer to comprise a conducting means having pore walls which are curved, or inclined with respect to the surface of the conductive layers. In addition, the surfaces of the conducting means should be smooth, i.e. have surface irregularities of no larger than 5% $d_{char}$ where $d_{char}$ is the dimension of the conducting means measured normally to the plane of the conductive layer. This ensures that directed liquid transport occurs.

The conducting media of the conducting means could be conducting by means of ions, electrons or holes and be a conductor or semi conductor. Although it is possible for the conducting media to be micro-porous, this would lead to a reduced liquid transport velocity and so it should preferably be non-microporous. Good results are obtained by using a permselective ion conductor. While the conducting media is preferably non-microporous itself, it may constitute the solid Matrix (or part of such) for a micro-porous structure.

Preferably, the conducting means is a ion exchange membrane, although other types of conducting membrane can also be employed. Onto each side of the conducting means, non-conducting layers are preferably deposited, to prevent direct contact between the conductive layers and the conducting means Of the porous layer. This can be done by coating, or another membrane production technique. Alternatively, the non-conducting layers could be produced by applying some treatment, for example chemical or plasma treatment, to the conducting membrane, rendering it non-conductive to some depth. The pore length axis should be normal or approximately normal to the membrane surface plane.

As mentioned previously, the pore walls should be smooth i.e. surface irregularities should be less than 5% of the characteristic diameter, $d_{char}$, preferably less than 1% $d_{char}$. In the case of a composite membrane, i.e. one comprising both conducting and non-conducting areas, the characteristic diameter should be measured as the thickness of the conducting part.

The pore diameter of the conducting means should be below $2a_{char}$, where $a_{char}$ is the characteristic radius and is equal to 0.5 $d_{char}$. Preferably the pore diameter is between ⅛ and 0.5 $a_{char}$. The thickness of the non conducting (insulation) layers is preferably smaller than $d_{char}$, most preferably between 0.1 and 0.5 $d_{char}$.

Alternatively, the conducting means may be a woven structure. Conducting fibres, for example ion exchange fibres of smooth circular cross-section, should be used in at least one weaving direction. Any yarn of a chosen cross-section could be used in the other direction, in order to fix the conducting means at a distance in said interval (smaller than $2a_{char}$, preferably between ⅛ to $0.5a_{char}$).

The conducting means must have a higher conductivity than the liquid to be transported. Therefore, when manufacturing the textile, the conducting media should be chosen based on the liquids that are most likely to come into contact with the textile, e.g. sweat, salt water, fresh water, alcohol etc. A tent fabric may therefore be made using a different conducting media than, say, a T-shirt. Textiles for use in vehicles intended for goods transport, for example transit vans, would be expected to come into contact with a wider range of fluids than, say, a fabric intended for use in a family vehicle. Therefore this may be made with a different conducting media.

The electric signal generator can be arranged to apply a direct current signal in order to effect liquid transport by either EO1 or EO2. Preferably, when arranged to apply a direct current signal this is supplied in the form of a pulsed signal. This signal can be used in situations in which the side effects caused by DC will not have a great effect, for example, during short operating times or when the fluid(s) within the fabric are dilute solutions.

In other situations it is preferable for the signal generator to be arranged to apply an alternating voltage to effect liquid transfer. The electric signal can consist of an alternating voltage with square-triangular-sawtooth-sine- or other shape.

Although it is usually required to apply a DC signal in order to obtain liquid transfer by classical electroosmosis, in situations in which the porous layer comprises an asymmetric membrane AC can also be used. In one embodiment therefore the porous layer comprises an asymmetric membrane and the signal generator is arranged to supply an AC signal to effect liquid transport via classical electroosmosis. Therefore, the following AC signal characteristics, while mainly described in relation to producing EO2, can also be used to induce classical electroosmotic flow in fabrics comprising an asymmetrical porous layer.

When inducing liquid transfer by EO2, the frequency must be below the hydrodynamic frequency. Thus, $a_{char}=1$ mm gives f_max=1 Hz, $a_{char}=100$ µm gives f_max=100 Hz, and $a_{char}=10$ µm gives f_max=10 kHz. A frequency ten times lower than this theoretical maximum should preferably be used, in order to obtain a significant period of flow in each pulse.

For symmetrical conducting means the signal should preferably have a duty cycle, and more preferably a duty cycle of 29%. This means that the strong pulse (which should have the polarity giving EO2 flow in the desired direction) should have a duration of 29% of the signal period. When using a duty-cycle, the signal should preferably have an offset, which is chosen so that the average signal direct component is zero.

For conducting means with a broken symmetry (e.g. FIG. 3) a symmetrical alternating signal could be used (square-triangular-sawtooth-sine-or other shape).

Preferably, the electric power should be delivered in the potentiostatic regime, as this gives the fastest polarization.

The signal could also be interrupted by a pause with no signal, which could occur for every N cycle of the signal, N being a number equal to or larger than one.

Preferably, the signal frequency should be chosen to be higher than the inverse conductive layer polarization time, $$t_{pol\_el} = \frac{L}{\kappa D}$$

Where L is the distance between conductive layers, κ is the inverse Debye length (inverse EDL thickness), and D the diffusion coefficient of current carrying ions.

If an alternating or pulsed electric signal is applied, the maximum frequency is determined by the hydrodynamic time constant, $$t_{HD} = \frac{a_{char}^2}{\nu}$$

where ν is the kinematic viscosity of the liquid.

When transporting liquid using EO2, a (normal) potential drop which is large enough for inducing the SCR must be present. This means that the dimensionless potential across one characteristic particle diameter is larger than unity, which translates into;

$$E > 0.013 V/a_{char}$$

In addition, the tangential field component must not be too large, otherwise the SCR is depleted of ions, and the SCR becomes thinner. Thus, the electric potential should not exceed:

$$E_{max\_SCR\_flux} = \left(\frac{3}{2}\right)^{\frac{4}{5}} \frac{RT}{F} m^{-\frac{2}{5}} \kappa^{\frac{4}{5}} a_{char}^{-\frac{1}{5}}$$

Here, R is the gas constant, T the temperature, F Faraday's constant, m a dimensionless constant equaling 0.2 for aqueous solutions, and κk the inverse Debye length.

In order to avoid water splitting, the concentration in the SCR should exceed the ion product of water. As EO2 convection counteracts the lowering of concentration resulting from polarisation, a lower electric field strength above which no water splitting is present is observed:

$$E_{mm\_WS} = \frac{3}{8\sqrt{2}} m^{-1} \left(\frac{k_w}{c}\right)^3 \frac{RT}{F} \kappa^2 a_{char}$$

where $k_w=10^{-7}$ M is the dissociation product of water, and c is the liquid ion concentration.

In addition comes the condition of thin SCR, which is fundamental in the theory of EO2. This is given by the expression:

$$E_{max\_thin\_SCR} = \frac{2}{9} \frac{RT}{F} \sqrt{m} \kappa^2 a_{char}$$

From these conditions an interval of electric field strengths for which EO2 will appear can be calculated for a certain system. This interval depends upon ion concentration and size of the conducting means among other things.

In order to reduce the charge build-up on the conductive layers, the driving AC or DC signal can be interrupted by a period with either no electric signal, or the shorting of the conductive layers (in such embodiments the conductive layers are connected through a low resistance wire e.g. by means of a relay), or by a voltage pulse oppositely directed to that set up by the charged conductive layers. In one embodiment, the voltage set up by the charged conductive layers is monitored electronically, and the data used to (electronically) calculate the duration and nature of the depolarizing period. The depolarization period would typically last from 0.1 to 5 seconds, and appear every 1 to 200 seconds, although other values could be used depending on the nature of the textile. In another embodiment the electric signal controlling liquid transport can be controlled based on feedback from conductivity sensors positioned within the textile.

Preferably the signal generator is also arranged to apply a further signal sufficient to cause heating of at least one conductive layer.

The control means is preferably an electronic device such as a microchip or computer, and it Could be automatically or manually operated. As mentioned previously, this could be done based on information of the system performance obtained from textile sensors, such as microsensors.

Viewed from another aspect the present invention provides a method for the transport of liquid within a textile and the heating of said textile, the textile comprising a porous layer sandwiched between two conductive layers, the method comprising the steps of applying a signal across the porous layer to effect liquid transport by electroosmosis and applying a signal across at least one of the conductive layers to effect heating.

The signal applied can have any of the characteristics listed above.

Preferably the method also comprises the steps of obtaining information on the operational conditions of the textile from sensors and controlling the liquid transport and heating signals based on this information. The sensors can be used to provide information on environmental conditions, physiological conditions, electrical properties within the textile, pressure and strain on the textile etc.

Alternatively the signals can be applied in response to manual operation.

Textiles according to the present invention have many potential uses. A non-exhaustive list is provided below.

---
SPORT

Clothing
Shoes
Tents
Sleeping bags
DEFENCE

Uniforms
Tents
Shoes
Electronic equipment
Storage
TRANSPORTATION

Air-planes
Ships
Containers
Cars
HEALTH

Bed linings
Electronic equipment
Carpets
BUILDINGS

Walls
Roofs
Swimming halls
INDUSTRY/ENGINEERING

Storage tents
Containers
Electronics
Geo-textiles
Runways, roads
Functional clothing
OTHER Collecting condensation water
Liquid seperation
Filtration.

---

These are all situations in which temperature and humidity control would provide advantages. It is particularly advantageous to use the textile in items of clothing, for example outdoor clothing designed for extreme conditions.

Another preferred use for the textile of the present invention is in storage materials, such as tarpaulins and tents, intended for use in sub-zero temperatures or for protecting temperature sensitive equipment.

The textile can also preferably be used in the interior of cars and other automotive road vehicles in order to increase the comfort of the occupants. For example, car seats, particularly those used in cold climates often have a heating function, which is usually provided by a heating plate within the seat. By covering at least part of the car seat with the textile of the present invention the need for a separate heating component is removed and further the car seat can also provide greater comfort to the user by removing liquid from the car seat surface. The textile therefore provides both heat and liquid transport without significantly adding to the bulk or weight of the car seat and is cheaper and less complex than currently available car seat heating and cooling apparatus.

In one preferred embodiment the textile of the present invention is used in the seat of a vehicle. However, it is also possible for the textile to be used on any other surface within the vehicle interior. By "vehicle interior" it is meant the area or areas of the vehicle occupied by persons during travel, i.e. the cabin area(s) of the vehicle. The textile of the present invention may be used on surfaces such as the vehicle's interior walls, floor or ceiling.

The term "Vehicle" is intended to cover all automotive road vehicles, such as cars, lorries, buses etc.

The electric signal generator and power supply could be included in the vehicle body and may be integral with other components of the vehicle. However preferably the electric signal generator is located within the textile. This reduces the amount of wiring necessary and increases the ease with which the signal generator can be located and fixed during any maintenance or repair work. In one embodiment, as discussed above, the textile comprises a power supply connected to the signal generator, such as a battery or solar panel. However, alternatively a single power supply can be used, for example, to power not only the textile of the present invention but also other electronically powered devices within the vehicle. In such embodiments it is preferred that the textile is powered by the car battery.

Viewed from another aspect therefore, the present invention provides a textile within a vehicle interior, the textile comprising first and second conductive layers; at least one porous layer positioned between first and second conductive layers, the pores of said porous layer extending in a direction substantially perpendicular to said conductive layers; the conductive layers being connected to an electric signal generator such that, in use, a voltage can be applied across said porous layer to effect directional flow of liquid across said textile, and a voltage can also be applied along at least one of the conductive layers to effect heating of said textile.

Viewed from another aspect the present invention provides a textile within a vehicle interior, the textile comprising first and second conductive layers; at least one porous layer positioned between said first and second conductive layers, the pores of said porous layer extending in a direction substantially perpendicular to said conductive layers; and at least one electrical contact attached to each conductive layer for connection to an electric signal generator, such that in use, a voltage can be applied across said porous layer to effect directional flow of liquid across said textile, and at least one additional electrical contact attached to at least one of the conductive layers for connection to an electric signal generator such that, in use, a voltage can be applied along at least one of the conductive layers to effect heating of said textile.

Viewed from a further aspect the present invention provides a method for the transport of liquid within a textile and the heating of said textile, the textile being within a vehicle interior and comprising a porous layer sandwiched between two conductive layers, the method comprising the steps of applying a signal across the porous layer to effect liquid transport by electroosmosis and applying a signal across at least one of the conductive layers to effect heating.

Preferred embodiments of the present invention will now be described, by way of example only, with reference to the accompanying drawings, in which.

Figure 1:
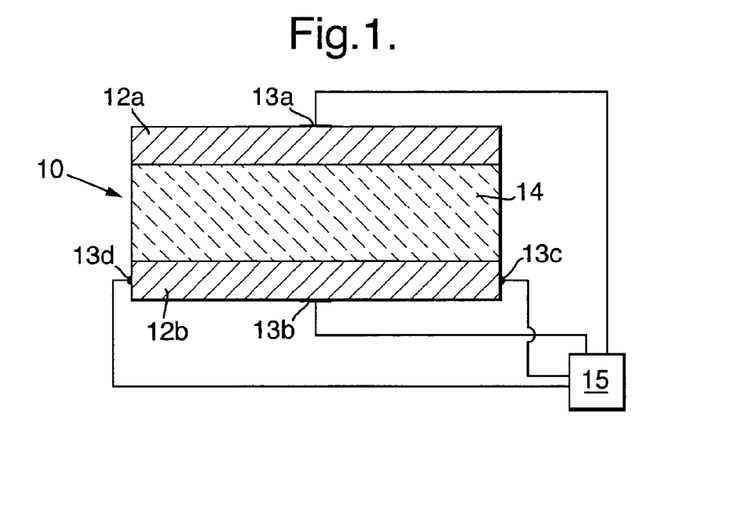
FIG. 1 shows a textile in accordance with the present invention.

FIG. 1 shows a textile 10 in accordance with the present invention. Conductive layers 12a, 12b sandwich a porous layer 14. Electrical contacts, 13 *a-d*, are attached to the conductive layers 12a, *b*. These are plugs which are in turn connected to electric signal generator 15. Electrical contacts 13a and 13b are positioned on conductive layers 12a and 12b respectively in an opposing relationship, while electrical contacts 13c and 13d are positioned at either end of conductive layer 12b. The contacts 13a-d are connected to the electric signal generator 15 such that a voltage can be applied between contacts 13a and 13b, in order to create a potential difference across the porous layer 14, and such that a potential difference can be applied between contacts 13c and 13d, thus allowing current to flow along conductive layer 12b, thus generating heat within the textile.

When a voltage is applied across contacts 13a and 13b directional transport of fluid within the porous layer 14 will occur, moving the fluid towards conductive layer 12a or 12b, depending on the signal generated by the electric signal generator 15.

This textile can therefore be utilised to direct fluid to either side of the textile 10, and further to heat the textile.

Figure 2:
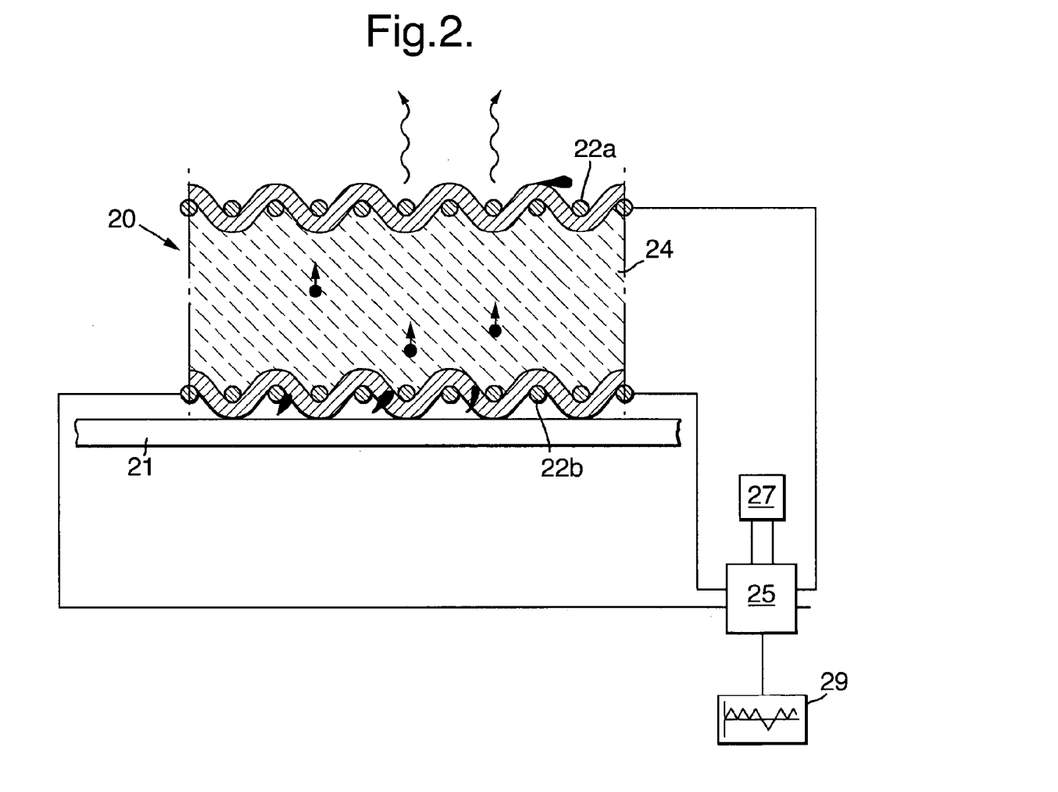
FIG. 2 shows a textile according to a further embodiment of the present invention.

FIG. 2 shows a textile 20 in accordance with the present invention in use in a piece of clothing. In this embodiment liquid transport occurs via classical electroosmosis. Porous layer 24 is provided by a layer or layers of cloth. On either side of the porous layer 24 conductive layers 22a, 22b are woven into the fabric. In use, the textile 20 rests against the skin 21 of the wearer. When the body exudes perspiration, the liquid penetrates into the porous layer 24 of the fabric, making this moist. By applying a voltage across conductive layers 22a, *b*, the water is driven from the skin side of the porous layer 24 in a direction away from the body. This will result in an accumulation of water towards the outside of the garment, which can then be removed through evaporation, this evaporation occurring due to heat from the surroundings as opposed to the human body.

The voltage is applied through electric signal generator/control means 25 which is powered by battery 27. This generator 25 can also be used to provide a voltage along conductive layer 22b. In this case only one additional connection between the conductive layers and the signal generator is used to provide this heating function. Textile 20 can therefore be used to assist in water transport of perspiration away from the body but serves the additional function of providing heat to the wearer. Although in FIG. 2 the heating layer is shown as conductive layer 22b closest to the skin 21, it is of course also possible for the signal generator/control means 25 to be connected such that conducting layer 22a acts to heat the textile. This can be of benefit when the heat is to be employed to assist in the evaporation of perspiration. In addition, it is also possible for connections to be made to both conductive layers 22a, *b* such that both of these layers can provide heat.

In FIG. 2, the electric signal generator/control means 25 is arranged to transmit the signal shown in window 29. This series of unidirectional pulses, interrupted by a pulse of opposite polarity, will induce classical electroosmotic flow within the porous layer 24. Using pulses rather than a continuous current, and including periodic pulses of opposite polarity, helps to reduce the unwanted side effects which can occur when using a DC signal.

Figure 2A:
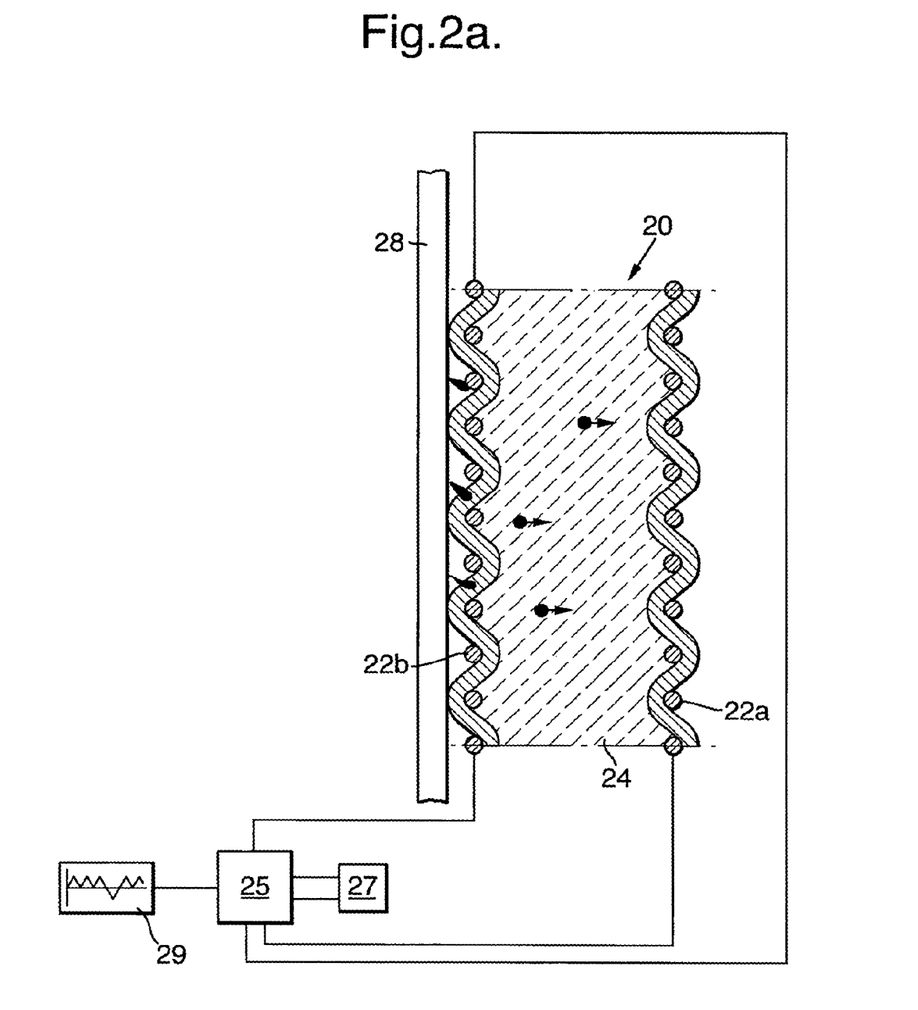
FIG. 2a shows the textile of FIG. 2 in an alternative use.

FIG. 2a shows the same textile 20 in use in the back rest of a car seat. The same reference numerals have therefore been used where appropriate. Porous layer 24 is provided by a layer or layers of cloth. On either side of the porous layer 24 conductive layers 22a, 22b are woven into the fabric. In use, the body of the user 28 rests against the textile 20. When the body exudes perspiration, the liquid penetrates into the porous layer 24 of the fabric, making this moist. By applying a voltage across conductive layers 22a, *b*, the water is driven from the skin side of the porous layer 24 in a direction away from the body.

The voltage is applied through electric signal generator/control means 25 which is powered by battery 27. This generator 25 can also be used to provide a voltage along conductive layer 22b. In this case only one additional connection between the conductive layers and the signal generator is used to provide this heating function. Textile 20 can therefore be used to assist in water transport of perspiration away from the body but serves the additional function of providing heat to the occupier of the seat. Although in FIG. 2a the heating layer is shown as conductive layer 22b closest to the user 28, it is of course also possible for the signal generator/control means 25 to be connected such that conducting layer 22a acts to heat the textile. In addition, it is also possible for connections to be made to both conductive layers 22a, *b* such that both of these layers can provide heat.

In FIG. 2a, the electric signal generator/control means 25 is arranged to transmit the signal shown in window 29. This series of unidirectional pulses, interrupted by a pulse of opposite polarity, will induce classical electroosmotic flow within the porous layer 24. Using pulses rather than a continuous current, and including periodic pulses of opposite polarity, helps to reduce the unwanted side effects which can occur when using a DC signal. After the user has vacated the car seat, this signal can be reversed to move the perspiration back across porous layer 24 to electrode 22b. The electric signal generator 25 can then apply a voltage across this electrode 22b in order to assist in the evaporation of the fluid.

Figure 3:
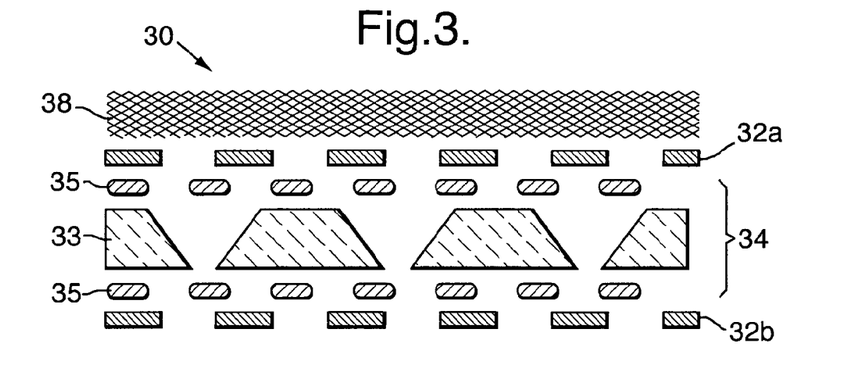
FIG. 3 shows a textile in accordance with the present invention, in which water transport is affected by electroosmosis of the second kind.

FIG. 3 shows a further fabric 30, in which water transport occurs through electroosmosis of the second kind. Here, conductive layers 32a, 32b are positioned on either side of porous layer 34. In this instance porous layer 34 consists of a porous conducting means 33 sandwiched between non-conducting porous layers 35, which separate conducting means 33 from the conductive layers 32a, *b*. For simplicity the electrical connections to the electric signal generator are not shown. However, the electric signal generator will be connected to the conductive layers 32a, *b* such that an electric field can be applied across porous layer 34 as well as along one or both of porous electrode layers 32a, *b*.

Conducting means 33 is a membrane having pores of varying size along its thickness, such that the pore walls are inclined with respect to the electric field applied across porous layer 34. In addition, the pore walls are smooth and hence conducting means 33 allows water transport to occur via electroosmosis of the second kind.

Textile 30 also contains an absorbent layer 38 positioned outside of conducting layer 32a. This layer 38 can be used to absorb liquid transported through porous layer 34.

Many other forms of porous conducting means can be used in order to obtain electroosmosis of the second kind.

Figure 4:
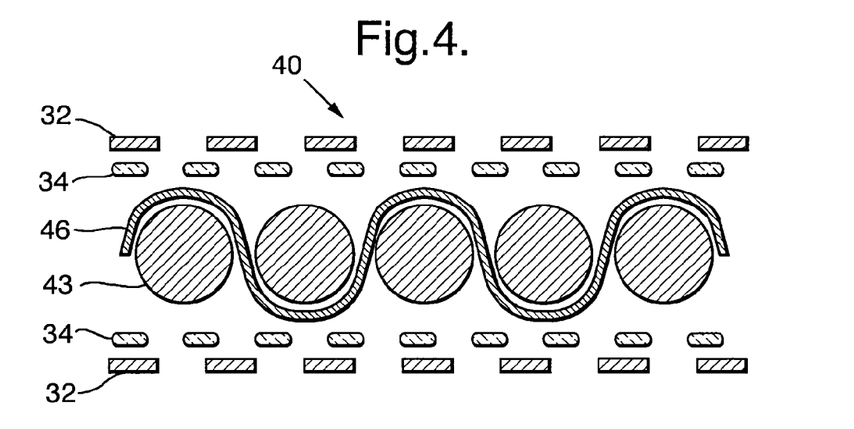
FIG. 4 shows a further embodiment of the present invention in which water transport is obtained via electroosmosis of the second kind.

In FIG. 4, conducting means 43 is provided in the form of smooth cylindrical fibres woven into textile 40. Thinner, non-conducting fibres 46 are used in the other weaving direction, in order to fix the conducting fibres at a distance of somewhat less than $a_{char}$ from each other. In this embodiment, non-conducting porous layers 34 and conducting layers 32 are also shown.

Figure 5:
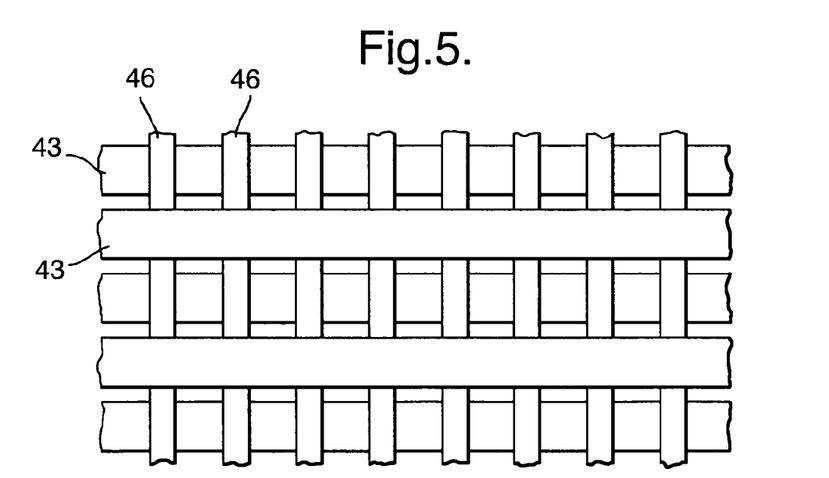
FIG. 5 shows a plan view of the conducting means of FIG. 4.

FIG. 5 shows a plan view of the woven layer of FIG. 4 showing the spacing and placement of conducting fibres 43 and non-conducting fibres 46. In each of these embodiments, either of the conducting electrode layers 32, or both can be used to heat the textile.

As mentioned above, the textile of the present invention can be used in many different applications. One advantageous use is within a vehicle.

Figure 6:
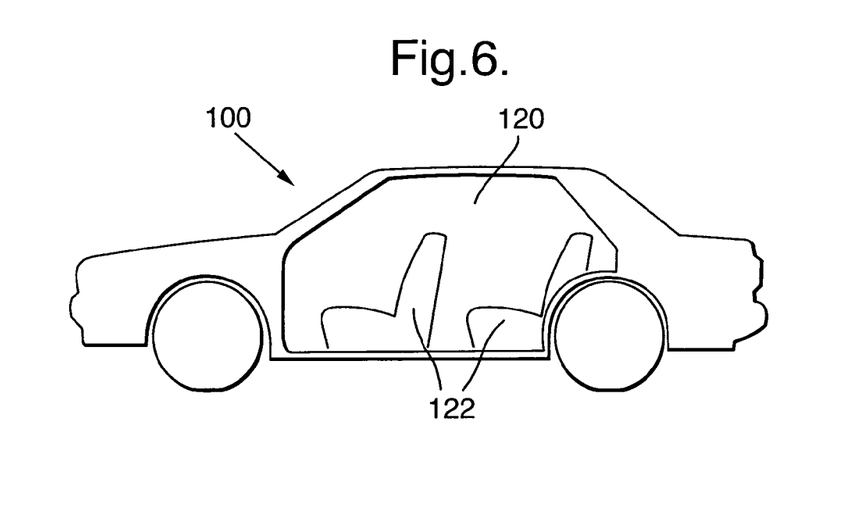
FIG. 6 shows a schematic view of a vehicle indicating the areas in which a textile in accordance with the present invention may be placed.

FIG. 6 shows a schematic view of a vehicle 100, in this instance a standard four seater car. The textile of the present invention can be situated at many positions within the vehicle interior 120. The vehicle interior 120 is classed as the cabin of the vehicle 100. This is the area of the car in which the occupants sit during travel. As well as providing the textile on the car seats 122, the textile can also be included in the material of the floor, roof and walls of the cabin area 120. In vehicles such as buses, where the driver may be located away from the passengers, the vehicle interior would include both the passenger seating area as well as the driver's cabin.

Figure 7:
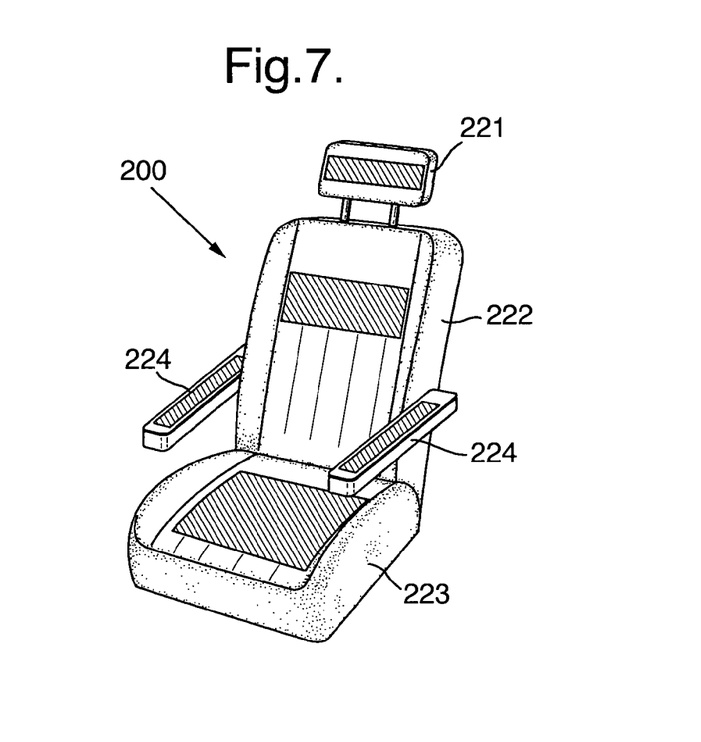
FIG. 7 shows a car seat comprising a textile according to the present invention.

FIG. 7 shows a car seat 200 consisting of a head rest 221, back rest 222, seat 223 and arm rests 224. The textile of the present invention can be used to cover the entire seat 200 or only certain areas of this. In FIG. 7, the shaded sections indicate where the textile has been used. These are areas where the user of the seat 200 is likely to be in contact with the seat surface and therefore would most benefit from the heating and water transport functions of the textile. Sensors, not shown, could be included within the textile to allow the control means to adjust operation of the textile based on the particular conditions. For example, if the sensors detect moisture, the conductive layers can be operated to induce water transport to ensure this is moved away from the user's body. Pressure sensors can be used to detect when a user has vacated a seat, enabling the control means to operate the conductive layers to transport fluid back to the car seat surface and heat and evaporate this fluid. An absorbent layer could be used to retain the transported perspiration prior to heating. Alternatively, if temperature sensors detected a temperature of below a pre-determined or user determined temperature, a period of heating could be entered.

Therefore, the present invention provides a very versatile textile that can be used to transport fluid and produce heat in a wide variety of applications.

EXAMPLE

A test was conducted into the efficiency of the textile at water transport within a ventilated car seat. The following textile sample was used:

polyimamide/30% by weight steel filament textile, laminated on each side of 100 micron thick polyvinylidene fluoride (PVDF) membrane with hydrophilizing surface treatment and pore size 0.1 micron The sample textile was placed on a porous foam of the same type as used in ventilated car seats and covered with a wet cloth. A dummy, designed to simulate a person sitting on the car seat, was placed on top of the cloth. The same test carried out on a ventilated seat without concurrent use of the textile of the present invention resulted in the removal of 20-40% of the water content of the cloth, and used 20-40 W of energy after initial drying (when it uses much more power).

The following table displays the results obtained using the textile of the present invention. This shows an equal or greater water transport can be obtained at a lower power consumption using the textile of the present invention.

| Signal | Initial Water Cont./g | Water Loss G | % water Loss | Current A | Power W | Time min |
| --- | --- | --- | --- | --- | --- | --- |
| No signal | 19.2 | 0.6 | 4.2 | — | — | 15 |
| 15 V | 18.8 | 0.5 | 3.6 | 0.82 | 12.2 | 15 |
| 15 V | 18.6 | 2.3 | 16.7 | 0.75 | 11.3 | 15 |
| 15 V | 18.8 | 9.3 | 66.4 | 0.75 | 11.3 | 15 |
| No signal | 18.9 | 1.9 | 13.5 | — | — | 15 |
| 12 V | 18.8 | 9.1 | 65.0 | 0.69 | 8.2 | 15 |
| No signal | 18.6 | 2.1 | 15.2 | — | — | 15 |
| 12 V | 19.1 | 6.9 | 46.3 | 0.6 | 7.2 | 15 |
| No signal | 19.1 | 1.9 | 13.3 | — | — | 15 |
| 12 V | 19.2 | 6.4 | 44.4 | 0.6 | 7.2 | 15 |
| No signal | 18.9 | 1.9 | 13.5 | — | — | 15 |
| 12 V | 19.2 | 5.9 | 41.0 | 0.54 | 6.5 | 15 |

The invention claimed is:

1. A textile comprising
    first and second conductive layers;
    at least one porous layer positioned between said first and second conductive layers, the pores of said porous layer extending in a direction substantially perpendicular to said conductive layers; and
    electrical contacts attached to said conductive layers and connected to an electrical signal generator, such that, in use,
    a voltage can be applied across said porous layer to effect directional flow of liquid across said textile, and
    at least one additional contact attached to at least one of the conductive layers which is connected to the electric signal generator such that, in use,
    a voltage can also be applied along at least one of the conductive layers to effect heating of said textile.

2. Clothing comprising a textile as claimed in claim 1.

3. Vehicle interior comprising a textile as claimed in claim 1.

4. A textile comprising
    first and second conductive layers;
    at least one porous layer positioned between first and second conductive layers, the pores of said porous layer extending in a direction substantially perpendicular to said conductive layers;
    the conductive layers being connected to an electric signal generator by electrical contacts, wherein each conductive layer comprises a first electrical contact and at least one conductive layer further comprises at least one additional contact, the electrical contacts being connected to the electric signal generator such that, in use,
    a voltage can be applied across said porous layer to effect directional flow of liquid across said textile, and
    a voltage can also be applied along at least one of the conductive layers to effect heating of said textile.

5. A textile as claimed in claim 4, wherein the conductive layers are connected to the signal generator by means of electrical contacts.

6. A textile as claimed in claim 5, wherein each conductive layer comprises a first electrical contact and at least one conductive layer further comprises an additional electrical contact,
    the first electrical contacts being connected to the electric signal generator so as to apply, in use, a voltage across the porous layer and
    the additional electrical contact being connected to the electric signal generator for operation with the relevant first electrical contact so as to apply, in use, a voltage along the at least one conductive layer to effect heating of the textile.

7. A textile as claimed in claim 6, wherein two additional contacts are attached to at least one conductive layer.

8. A textile as claimed in claim 4, wherein the conductive layers are metal filament woven textiles having a metal content of between 3-100% by weight.

9. A textile as claimed in claim 8, wherein an additional embroidered metal structure is positioned in contact with the one or more conductive layers which, in use, effect heating of the textile.

10. A textile as claimed in claim 4, further comprising one or more absorbent layers.

11. A textile as claimed in claim 4, wherein the porous layer is constructed to provide liquid transport by classical electroosmosis, and wherein the porous layer is a porous membrane made of a hydrophobic polymer.

12. A textile as claimed in claim 11, wherein the membrane is treated with a hydrophilising surface treatment.

13. A textile as claimed in claim 12, wherein the treatment introduces sulfonic acid groups onto the pore surface.

14. A textile as claimed in claim 13, wherein the average pore size of the membrane is between 0.1 and 1 μm.

15. A textile as claimed in claim 4, further comprising a control means for control of said signal generator.

16. A textile as claimed in claim 15, further comprising sensors, said control means being adapted to obtain information from said sensors and adjust the output of the signal generator accordingly.

17. Clothing comprising a textile as claimed in claim 4.

18. Vehicle interior comprising a textile as claimed in claim 4.

* * * * *